United States Patent
Liu et al.

(10) Patent No.: US 8,938,422 B1
(45) Date of Patent: Jan. 20, 2015

(54) DELAY RETRIEVAL OF SYNCHRONIZATION INFORMATION

(75) Inventors: Xiaoyong Liu, Kirkland, WA (US); Nicolas Zea, Seattle, WA (US); Razvan Mathias, Redmond, WA (US)

(73) Assignee: Google Inc., Mountain View, CA (US)

( * ) Notice: Subject to any disclaimer, the term of this patent is extended or adjusted under 35 U.S.C. 154(b) by 131 days.

(21) Appl. No.: 13/586,473

(22) Filed: Aug. 15, 2012

Related U.S. Application Data (60) Provisional application No. 61/530,884, filed on Sep. 2, 2011.

(51) Int. Cl.
  *G06F 7/00* (2006.01)
  *G06F 17/00* (2006.01)
(52) U.S. Cl.
  USPC .......................................... 707/628; 707/632
(58) Field of Classification Search
  USPC ................ 707/617–619, 628, 637, 632
  See application file for complete search history.

(56) References Cited

U.S. PATENT DOCUMENTS

| 8,392,617 | B1* | 3/2013 | Weber et al. ............... 709/248 |
| 2005/0066158 | A1* | 3/2005 | Mowery et al. ................ 713/2 |
| 2007/0136305 | A1* | 6/2007 | Kelley et al. .................. 707/10 |
| 2007/0162582 | A1* | 7/2007 | Belali et al. ................ 709/223 |
| 2007/0162852 | A1* | 7/2007 | Jung et al. ................... 715/716 |
| 2008/0301562 | A1* | 12/2008 | Berger et al. ............... 715/733 |
| 2009/0150569 | A1* | 6/2009 | Kumar et al. .............. 709/248 |
| 2012/0331406 | A1* | 12/2012 | Baird et al. ................ 715/760 |

* cited by examiner

*Primary Examiner* — James E Richardson
(74) *Attorney, Agent, or Firm* — McDermott Will & Emery LLP (57) ABSTRACT

A computer-implemented method for delaying synchronization of a computing device is disclosed according to one aspect of the subject technology. The method comprises receiving an update notification at the computing device, determining whether the computing device is idle, and, if the computing device is idle, then delaying retrieval of synchronization information corresponding to the update notification. The method also comprises determining whether a user has started using the computing device, and, if the user has started using the computing device, then retrieving the synchronization information corresponding to the update notification.

26 Claims, 4 Drawing Sheets

DELAY RETRIEVAL OF SYNCHRONIZATION INFORMATION

CROSS-REFERENCE TO RELATED APPLICATION

The present application claims the benefit of U.S. Provisional Patent Application Ser. No. 61/530,884, entitled "Delay Retrieval of Synchronization Information," filed on Sep. 2, 2011, which is hereby incorporated by reference in its entirety for all purposes.

FIELD

The subject disclosure generally relates to computing devices, and, in particular, to synchronizing information across multiple computing devices.

BACKGROUND

Information pertaining to a computer application (e.g., a web browser) may be synchronized across multiple computing devices that are used by a user. For example, a local copy of the information may be stored at each computing device. When the user works on one of the computing devices, the user may make local changes to the information at the computing device. To maintain synchronization among the computing devices, the computing device may send an update with the changes to a server. The server may store the update in a user account and send the update to the other computing devices. Upon receiving the update from the server, each of the other computing devices may update its local copy of the information accordingly. As a result, changes made to the information at one computing device are reflected at the other computing devices.

SUMMARY

A computer-implemented method for delaying synchronization of a computing device is disclosed according to one aspect of the subject technology. The method comprises receiving an update notification at the computing device, determining whether the computing device is idle, and, if the computing device is idle, then delaying retrieval of synchronization information corresponding to the update notification. The method also comprises determining whether a user has started using the computing device, and, if the user has started using the computing device, then retrieving the synchronization information corresponding to the update notification.

A machine-readable medium comprising instructions stored therein is disclosed according to one aspect of the subject technology. The instructions, which when executed by a machine, cause the machine to perform operations for delaying synchronization of a computing device. The operations comprise determining whether the computing device is idle, and, if the computing device is idle, then delaying retrieval of synchronization information. The operations also comprise determining whether a user has started using the computing device, and, if the user has started using the computing device, then performing the steps. The steps comprise (a) sending a request for the synchronization information to a server, (b) receiving the synchronization information from the server in response to the request, and (c) updating local information stored on the computing device with the received synchronization information.

A system for delaying synchronization of a computing device is disclosed according to one aspect of the subject technology. The system comprises one or more processors, and a machine-readable medium comprising instructions stored therein, which when executed by the one or more processors, cause the one or more processors to perform operations. The operations comprise determining whether the computing device is idle, and, if the computing device is idle, then disconnecting the computing device from a server. The operations also comprise determining whether a user has started using the computing device, and, if the user has started using the computing device, then performing the steps. The steps comprise (a) reconnecting the computing device to the server, (b) sending a request for synchronization information to the server; and (c) receiving the synchronization information from the server is response to the request.

Various aspects of the subject technology provide a computing device that is configured to delay sending an update request to a server after receiving an update notification from the server when the computing device is idle (i.e., the user is not currently using the computing device). The computing device may be idle when the computing device is in a sleep mode, a screen saver mode and/or a locked mode. The computing device may also be idle after no user activity is detected on the device for a certain time interval. The computing device may delay sending the update request until the user starts using the computing device again or until an update time interval has elapsed while the computing device is still idle.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

Information pertaining to a computer application (e.g., a web browser) may be synchronized across multiple computing devices that are used by a user. For example, a local copy of the information may be stored at each computing device. When the user works on one of the computing devices, the user may make local changes to the information at the computing device. To maintain synchronization among the computing devices, the computing device may send an update with the changes to a server. The server may store the update in a user account. The server may then send an update with the changes to each of the other computing devices so that each of the other computing devices may update its local copy of the information accordingly.

If one of the other computing devices is connected to the server, then the server may first send an update notification to the computing device notifying the computing device that an update is available at the server. In response to the update notification, the computing device may send an update request for the update to the server. In response to the update request, the server may send the update to the computing device.

In one approach, each time a computing device receives an update notification from the server, the computing device may immediately send a corresponding update request to the server to retrieve the update.

However, this approach may result in a large amount of traffic at the server. For example, when the server receives frequent updates, the server sends (pushes) frequent updates to the computing device. This is because the computing device immediately requests updates from the server after receiving update notifications from the server. The frequent updates to the computing device may result in a large amount of traffic at the server. When the user is not currently using the computing device, the large amount of traffic may be unnecessary. This is because the computing device does not need to be continuously synchronized when the user is not using the computing device.

To address this problem, various aspects of the subject technology provide a computing device that is configured to delay sending an update request to the server after receiving an update notification from the server when the computing device is idle (i.e., the user is not currently using the computing device). The computing device may be idle when the computing device is in a sleep mode, a screen saver mode and/or a locked mode. The computing device may also be idle after no user activity is detected on the device for a certain time interval. The computing device may delay sending the update request until the user starts using the computing device again or until an update time interval has elapsed while the computing device is still idle.

Various aspects of the subject technology will now be described using an example of browser information. However, it should be appreciated that the subject technology is not limited to this example, and that the subject technology may be used to synchronize any type of information across multiple computing devices.

Figure 1:
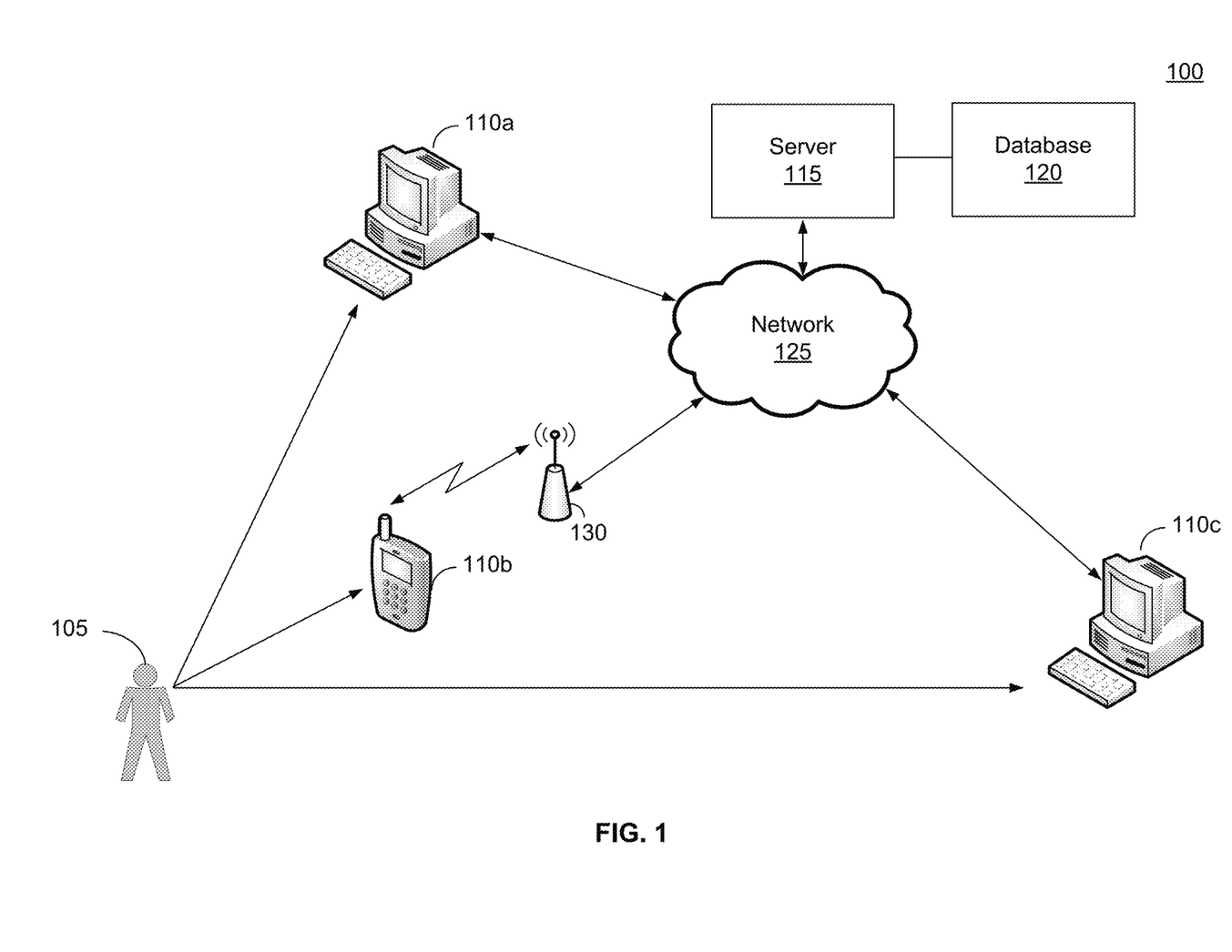
FIG. 1 is a conceptual block diagram of a system for synchronizing information across multiple computing devices according to an aspect of the subject technology.

FIG. 1 shows a system 100 for synchronizing browser information across multiple computing devices according to an aspect of the subject technology. The system 100 may comprise multiple computing devices 110a-110c, a server 115 and a database 120. Each computing device 110a-110c may be a laptop computer, a desktop computer, a tablet, a smart phone, a personal digital assistant (PDA), or other type of computing device. Each computing device 110a-110c may communicate with the server 115 over a network 125, for example, a local area network (LAN), a wide area network (WAN), an intranet and/or the Internet. In one aspect, one or more of the computing devices 110b may communicate with the network 125 via a wireless link (e.g., a WiFi wireless link, a cellular wireless link, etc.) with a base station or a wireless access point 130 connected to the network 125. While the system 100 is shown in one exemplary configuration in FIG. 1, it is to be understood that the system 100 may include additional or fewer computing devices.

In one aspect, each computing device 110a-110c may be configured to load and execute a web browser that allows a user 105 to retrieve and view web content from the network 125 (e.g., the Internet). Each computing device 110a-110c may store a local copy of browser information in a respective local memory. The browser information may comprise configuration and setting information for the web browser, browser history, and other information pertaining to the web browser. Examples of different types of browser information that may be used according to various aspects of the subject technology are provided below.

The browser information may include the user's browser preferences. The user's browser preferences may specify the home web page that is displayed in the browser window at startup. The user's browser preferences may also specify user selected browser settings.

The browser information may also include bookmarks for providing shortcuts to the user's favorite web pages. The user 105 may edit the bookmarks by adding and/or removing web pages from the bookmarks. For example, the user may add a new bookmark entry (new web page) to the bookmarks by clicking on an icon (e.g., a star icon) when the web page is displayed in the browser window and/or the URL of the web page is in the address bar.

The browser information may also include a browser history listing the web addresses (e.g., URLs) of web sites visited by the user during one or more browser sessions. The browser information may also include a list of URLs typed into the address bar by the user.

The browser information may also include tab information specifying web pages that are currently opened on the web browser. In this example, the web browser may include a tab bar with one or more tabs, where each tab represents a web page that is opened on the web browser. The tab bar allows the user 105 to navigate between multiple web pages that are opened on the web browser. For example, the user 105 may view a particular one of the web pages by clicking on the corresponding tab. The tab information may include the web address (e.g., URL) of each web page that is opened on the web browser. The tab information may be updated when the user opens or closes a tab.

The browser information may also include theme information specifying a theme of the web browser. The theme allows the user 105 to customize the look of the web browser. For example, the theme information may specify one or more user selected colors for the toolbar and frame of the web browser, and a user selected image for the background of the browser window.

The browser information may also specify one or more applications that are installed on the respective computing device 110a-110c. An application may be a web-based application that can be used within the web browser (e.g., to play a video from a web site). The browser information may also include one or more software extensions, each of which may comprise program code that adds additional functionalities to the web browser.

The browser information may also include password information for one or more web sites visited by the user 105. When the user 105 logs into a web site using a user name and a password, the web browser may store the user name and the password for future use. The user name may comprise a user email address. On subsequent visits to the web site, the web browser may automatically enter the stored user name and password so that the user does not have to reenter the user name and password each time the user visits the web site.

The browser information may also include autofill data. For example, when the user 105 enters information (e.g., name, address, phone number, etc.) into a web form, the web browser may store the entered information as autofill data. When the user 105 has to subsequently fill similar information (e.g., name, address, phone number, etc.) in the same web form or other web form, the web browser may automatically fill in some or all of the information in the web form using the stored autofill data. The autofill data may include the user's name, address, phone number, billing information, and/or other types of information.

It should be appreciated that the subject technology is not limited to the exemplary browser information given above, and that other types of browser information may also be used in addition to or in the alternative to the exemplary browser information given above.

In one aspect, the server 115 is configured to synchronize browser information across the computing devices 110a-110c. The user 105 may use different ones of the computing devices 110a-110c for web browsing at different times. For example, the user 105 may use computing device 110a (e.g., a desktop or laptop computer) for web browsing at work and/or home, and use computing device 110b (e.g., a smart phone or tablet) for web browsing on the go. By synchronizing browser information across the computing devices 110a-110c, the user's browser information (e.g., browser preferences, theme, bookmarks, browser history, etc.) is available on any one of the computing devices 110a-110c.

Each computing device 110a-110c may connect to the server 115 over the network 125. For example, the user 105 may connect a computing device 110a-110c to the server 115 by logging onto the server 115 from the computing device 110a-110c. To do this, the user 105 may enter user credentials (e.g., user name, password, etc.) at the computing device 110a-110c and the computing device 110a-110c may send the user credentials to the server 115 over the network 125. If the server 115 authenticates the user based on the received user credentials, then the server 115 may grant the computing device 110a-110c access to a user account stored on the database 120. As discussed further below, a copy of the user's browser information may be stored in the user account to synchronize the computing devices 110a-110c. The user 105 may connect multiple computing devices 110a-110c to the server 115 at a time, for example, by logging onto the server 115 from each of the computing devices 110a-110c.

To establish initial synchronization among the computing devices 110a-110c, the user 105 may enable synchronization at computing device 110a, for example, by enabling a synchronization setting on the web browser. The user 105 may then log computing device 110a onto the user account at the server, for example, by entering user credentials at computing device 110a.

Upon successful login, computing device 110a may inform the server 115 that synchronization has been enabled. Computing device 110a may then send the browser information stored locally at computing device 110a to the server 115 over the network 125. Upon receiving the browser information from computing device 110a, the server 115 may store the received browser information in the user account on the database 120. The browser information stored in the user account may be referred to as synchronization information or data.

When the user logs onto the server 115 from computing device 110b and enables synchronization at computing device 110b, the server 115 may send the browser information stored in the user account to computing device 110b over the network 125. When computing device 110b receives the browser information from the server 115, computing device 110b executes a synchronization process.

First, the computing device 110b may compare the received browser information with browser information stored locally at computing device 110b. If the received browser information includes information (e.g., bookmark entries, autofill data, etc.) that is missing from the local browser information, then computing device 110b may update the local browser information to include the missing information. If the local browser information includes information (e.g., bookmark entries, autofill data, etc.) that is missing from the received information, then computing device 110b may push the missing information to the server 115. In this case, the server 115 may update the browser information (synchronization information) in the user account with the missing information and push the missing information to computing device 110a so that computing device 110a can update its local browser information accordingly.

If some of the received browser information conflicts with some of the local browser information at computing device 110b, then computing device 110b may resolve the conflict according to a conflict-resolution policy. For example, each entry (e.g., bookmark entry, autofill data entry, theme, etc.) in the received browser information and the local browser information may be time stamped with the date that the entry was created and/or last modified. In this example, when a entry in the received browser information conflicts with an entry in the local browser information, computing device 110b may resolve the conflict in favor of the entry that was most recently created or modified. If the entry in the received browser information wins the conflict, then computing device 110b may replace the entry in the local browser information with the received entry. If the entry in the local browser information wins the conflict, then computing device 110b may push the entry in the local browser information to the server 115 with instructions to replace the corresponding entry in the user account with the entry from computing device 110b. In this case, the server 115 may push the entry from computing device 110b to computing device 110a. It should be appreciated that the subject technology is not limited to the exemplary conflict-resolution policy discussed above and that other types of conflict-resolution policies may be adopted.

As a result of the synchronization process, the browser information at computing devices 110a and 110b and the browser information (synchronization information) in the user account are synchronized with one another. The process described above may be repeated for each additional computing device that the user 105 desires to synchronize with the user account.

After the computing devices 110a-110c are initially synchronized, the server 115 may maintain synchronization among the computing devices 110a-110c. When the user 105 makes local changes to the browser information (e.g., the user adds and/or deletes one or more bookmark entries) at any one of the computing devices 110a-110c, the computing device may send an update with the changes to the server 115. The server 115 may then update the browser information (synchronization information) stored in the user account based on the received update. As a result, the browser information stored in the user account is synchronized with the changes.

The server 115 also sends an update to each of the other computing devices 110a-110c with the changes so that each of the other computing devices 110a-110c can update its local copy of the browser information accordingly. If one of the other computing devices 110a-110c is not connected to the server 115, then the server 115 may wait until the computing device 110a-110c logs onto the server 115 to send the update to the computing device 110a-110c. If one of the other computing devices 110a-110c is connected to the server 115, then the server 115 may first send an update notification to the computing device 110a-110c notifying the computing device 110a-110c that an update is available at the server 115. In response to the update notification, the computing device 110a-110c may send an update request for the update to the server 115. In response to the update request, the server 115 may send the update to the computing device 110a-110c.

In one approach, each time a computing device 110a-110c receives an update notification from the server 115, the computing device 110a-110c may immediately send a corresponding update request to the server 115 to retrieve the update.

However, this approach may result in a large amount of traffic at the server 115. For example, when the server 115 receives frequent updates, the server 115 sends (pushes) frequent updates to the computing device 110a-110c. This is because the computing device 110a-110c immediately requests updates from the server 115 after receiving update notifications from the server 115. The frequent updates to the computing device 110a-110c may result in a large amount of traffic at the server 110a-110c. When the user is not currently using the computing device 110a-110c, the large amount of traffic may be unnecessary. This is because the computing device 110a-110c does not need to be continuously synchronized when the user 105 is not using the computing device 110a-110c.

To address this problem, the computing device 110a-110c may be configured to delay sending an update request to the server 115 after receiving an update notification from the server 115 when the computing device 110a-110c is idle (i.e., the user is not currently using the computing device 110a-110c). In one aspect, the computing device 110a-110c may delay sending the update request until the user 105 starts using the computing device 110a-110c again.

The computing device 110a-110c may employ one or more of the following methods to determine when the computing device 110a-110c is idle (i.e., the user is not currently using the computing device 110a-110c).

For example, the computing device 110a-110c may determine that the computing device 110a-110c is idle when the computing device 110a-110c is in a screen saver mode, a sleep mode and/or a locked mode. In the sleep mode, the computing device 110a-110c may shut down and/or reduce the power of various components in the computing device 110a-110c to conserve power. In the locked mode, the computing device 110a-110c may be locked and require that the user 105 enter a password to unlock the device. The computing device 110a-110c may enter the screen saver mode, the sleep mode and/or the locked mode after a period of user inactivity.

In another example, the computing device 110a-110c may detect user activity on the computing device. The user activity may include a mouse movement, a user finger on a touch screen, the user 105 entering text and/or commands into the computing device using a keyboard, etc. In this example, the computing device 110a-110c may determine that the computing device 110a-110c is idle when the computing device 110a-110c does not detect user activity for a certain time period (e.g., a few minutes). The time period may be a parameter that is configurable by the server 115. For example, the server 115 may send a command to the computing device 110a-110c specifying the time period.

The computing device 110a-110c may employ one or more of the following methods to determine when the user 105 starts using the computing device 110a-110c after the computing device 110a-110c has been idle.

For example, the computing device 110a-110c may determine that the user 105 is starting to use the computing device 110a-110c when the computing device 110a-110c switches from the screen saver mode, the sleep mode and/or the locked mode to an active mode. Switching out of the sleep mode may involve powering up one or more components of the computing device 110a-110c. Switching out of the locked mode may require the user 105 to unlock the device, for example, by entering a password.

In another example, the computing device 110a-110c may monitor for user activity when the computing device 110a-110c is idle. In this example, the computing device 110a-110c may determine that the user 105 is starting to use the computing device 110a-110c when the computing device first detects user activity. The user activity may include a mouse movement, a user finger on a touch screen, the user 105 entering text and/or commands into the computing device using a keyboard, etc.

In one aspect, the computing device 110a-110c may stay connected to the server 115 while the computing device is idle. For example, the computing device 110a-110c may stay connected to the server 115 via a persistent connection. In this aspect, the computing device 110a-110c may receive one or more update notifications from the server 115 while the computing device 110a-110c is idle. The computing device 110a-110c may store the received update notifications in a queue in local memory and delay sending update requests for the corresponding updates while the computing device 110a-110c is idle.

When the computing device 110a-110c detects the user 105 starting to use the computing device 110a-110c, the computing device 110a-110c may send an update request to the server 115 for the updates corresponding to the update notifications in the queue. For example, each update notification may include an identifier identifying the corresponding update at the server 115. In this example, the computing device 110a-110c may send an update request to the server 115 for all of the updates identified by the update notifications in the queue. In another example, when computing device 110a-110c detects at least one update notification in the queue, the computing device 110a-110c may send an update request to the server 115 requesting all updates at the server 115 awaiting transmission to the computing device 110a-110c. Thus, when the user 105 starts using the computing device 110a-110c, the computing device 110a-110c may send an update request to the server 115 for all of the updates corresponding to the update notifications that the computing device 110a-110c received while the computing device 110a-110c was idle.

In response to the update request, the server 115 may send the corresponding updates to the computing device 110a-

110c. Upon receiving the updates from the server 115, the computing device 110a-110c may update its local copy of the browser information accordingly and clear the update notifications from the queue. Thus, when the computing device 110a-110c is idle, the computing device 110a-110c may wait until the user 105 starts using the computing device 110a-110c to synchronize the computing device 110a-110c with the user account.

This aspect of the subject technology advantageously reduces the frequency at which updates are sent to the computing device 110a-110c, and therefore the amount of traffic at the server, when the user 105 is not currently using the computing device 110a-110c. This is because, when the server 115 frequently receives updates, the server 115 does not need to frequently send updates to the computing device 110a-110c while the computing device 110a-110c is idle. Instead, the server 115 may send the updates at one time to the computing device 110a-110c when the user 105 starts using the computing device 110a-110c.

Figure 2:
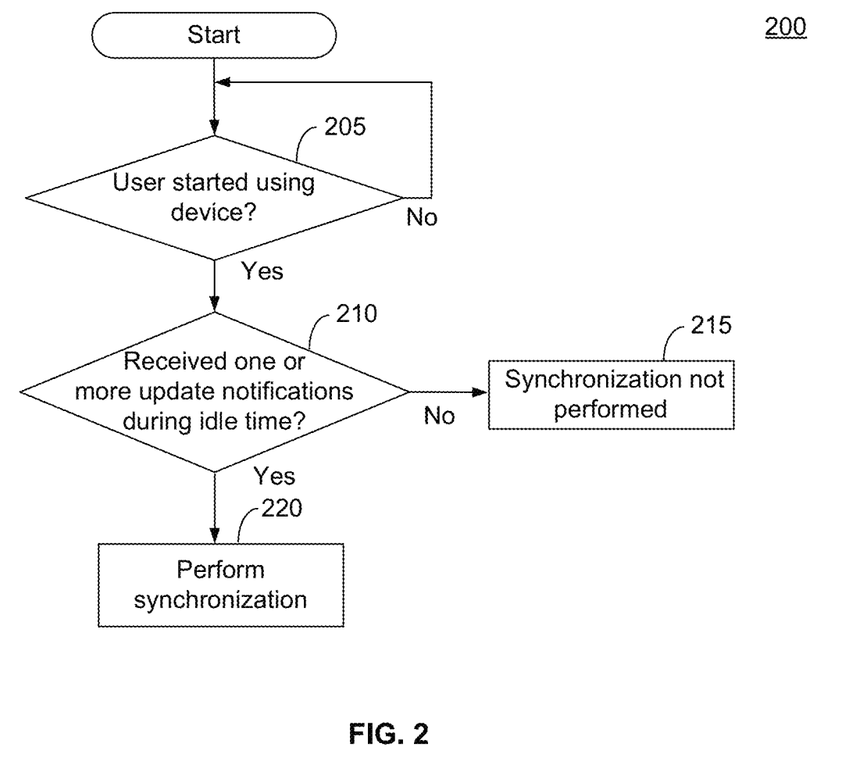
FIG. 2 shows a method for delaying retrieval of updates when a computing device is idle according to an aspect of the subject technology.

FIG. 2 shows a method 200 for delaying retrieving updates when the computing device 110a-110c is idle according to an aspect of the subject technology. The method 200 may be performed by the computing device 110a-110c. The computing device 110a-110c may start method 200 when the computing device 110a-110c detects that the computing device has become idle (e.g., computing device enters the screen saving mode, the sleep mode and/or the locked mode).

In step 205, the computing device 110a-110c determines whether the user 105 has started using the device 110a-110c. For example, the computing device 110a-110c may determine that the user has started using the device when the computing device switches out of the screen saving mode, the sleep mode and/or the locked mode. In another example, the computing device 110a-110c may determine that the user has started using the device when the computing device 110a-110c detects user activity on the device.

If the computing device 110a-110c detects the user 105 using the device, then the computing device 110a-110c proceeds to step 210. In this case, the computing device is no longer idle. If the computing device 110a-110c does not detect the user 105 using the device, then the computing device 110a-110c returns to step 205.

In step 210, the computing device 110a-110c determines whether the computing device 110a-110c received one or more update notifications from the server 115 during the time that the computing device 110a-110c was idle. For example, the computing device 110a-110c may check the queue to determine whether there are one or more update notifications in the queue.

If the computing device 110a-110c did not receive an update notification, then synchronization is not performed at this time in step 215. If the computing device 110a-110c received one or more update notifications, then the computing device 110a-110c proceeds to step 220.

In step 220, the computing device 110a-110c performs synchronization. To do this, the computing device 110a-110c may retrieve updates corresponding to the one or more update notifications from the server 115 and update its local copy of the browser information according to the retrieved updates. The computing device 110a-110c may retrieve the updates by sending an update request to the server 115.

In one aspect, when the computing device 110a-110c is idle, the computing device 110a-110c may check whether there is at least one update notification in the queue after every update time interval (e.g., one hour). If there are one or more update notifications in the queue, then the computing device 110a-110c may send a corresponding update request to the server 115, clear the queue after receiving the corresponding updates from the server 115, and check the queue again after another update time interval (e.g., one hour). If there is no update notification in the queue, then the computing device 110a-110c may check the queue again after another update time interval (e.g., one hour). When the user 105 starts using the computing device 110a-110c, the computing device 110a-110c may send an update request to the server 115 at this time requesting all updates corresponding to the update notifications currently in the queue.

Thus, the update time interval may be used to force the computing device 110a-110c to periodically send an update request to the server 115 (every update time interval) when the computing device is idle for a long period of time (e.g., longer than the update time interval). This reduces the amount of synchronization data that needs to be sent to the computing device 110a-110c when the user starts using the computing device 110a-110c after the computing device 110a-110c has been idle for a long period of time.

The update time interval may be a parameter that is configurable by the server 115. For example, the server 115 may send a command to the computing device 110a-110c specifying the update time interval.

Figure 3:
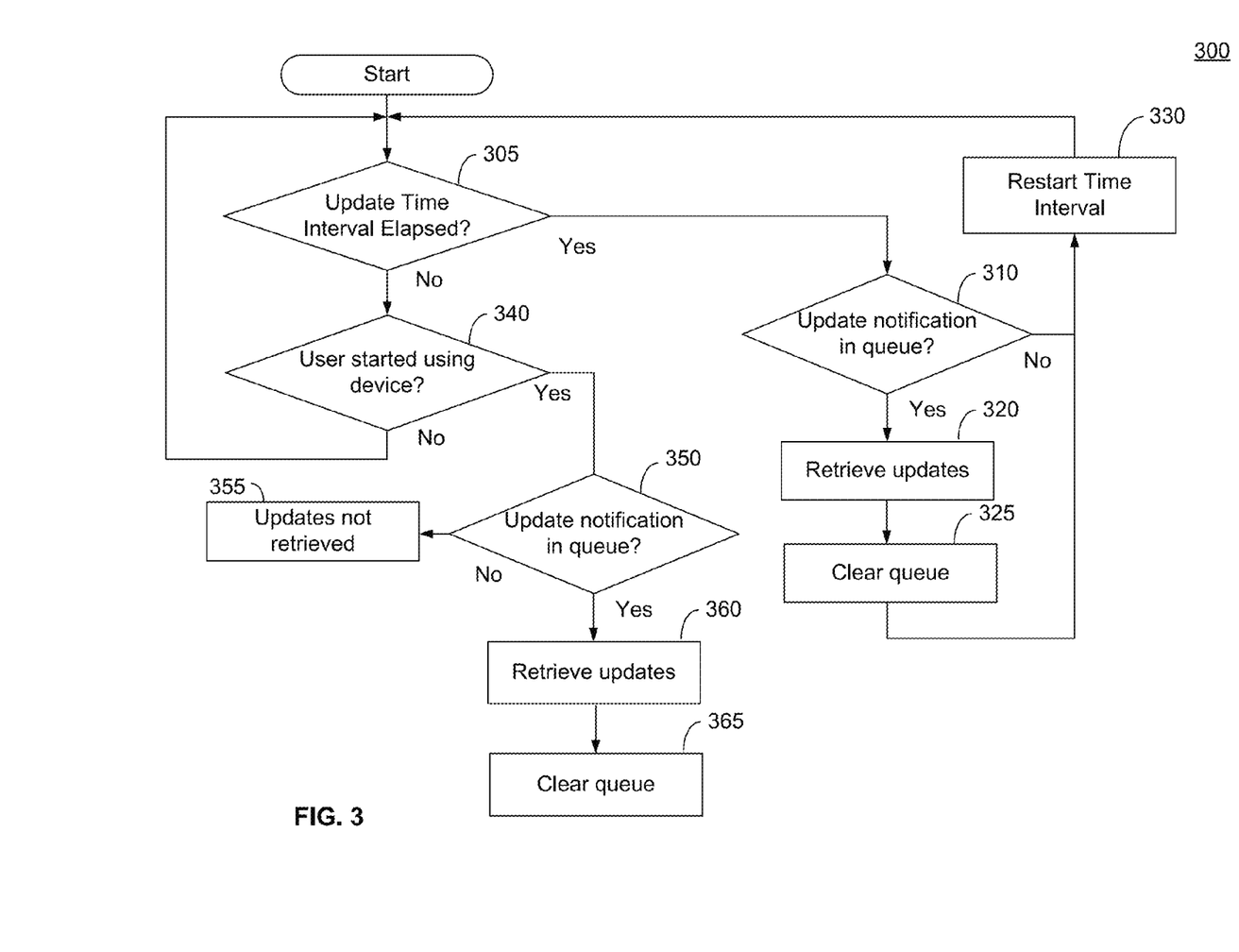
FIG. 3 shows a method for delaying retrieval of updates when a computing device is idle according to another aspect of the subject technology.

FIG. 3 shows a method 300 for delaying retrieving updates when the computing device 110a-110c is idle according to an aspect of the subject technology. The method 300 may be performed by the computing device 110a-110c. The computing device 110a-110c may start method 300 when the computing device 110a-110c detects that the computing device has become idle (e.g., computing device enters the screen saving mode, the sleep mode and/or the locked mode).

In step 305, the computing device 110a-110c determines whether an update time interval has elapsed (e.g., one hour). The computing device 110a-110c may do this by determining whether the time value of a timer is equal to or exceeds the update time interval. The computing device 110a-110c may start the timer when the computing device becomes idle. If the updated time interval has elapsed, then the computing device 110a-110c proceeds to step 310. Otherwise the computing device 110a-110c proceeds to step 340.

In step 310, the computing device 110a-110c determines whether there are one or more update notifications in the queue. If there is no update notification in the queue, then the computing device 110a-110c proceeds to step 330. Otherwise, the computing device 110a-110c proceeds to step 320.

In step 320, the computing device 110a-110c may retrieve one or more updates from the server 115 corresponding to the one or more update notifications in the queue. To do this, the computing device 110a-110c may send an update request to the server 115. When the computing device 110a-110c receives the updates from the server 115, the computing device 110a-110c may synchronize its local browser information at this time by updating its local browser information with the received updates. Alternatively, the computing device 110a-110c may store the received updates in local memory and update its local browser information at a later time, for example, when the user starts using the device.

In step 325, the computing device 110a-110c clears the queue. In step 330, the computing device 110a-110c restarts the timer used to determine whether the update time interval has elapsed. The computing device 110a-110c then returns to step 305.

In step 340, the computing device 110a-110c determines whether the user 105 has started using the device 110a-110c. If the computing device 110a-110c detects the user 105 using the device, then the computing device 110a-110c proceeds to step 350. In this case, the computing device is no longer idle.

If the computing device 110a-110c does not detect the user 105 using the device, then the computing device 110a-110c returns to step 305.

In step 350, the computing device 110a-110c determines whether there are one or more update notifications in the queue. If there is no update notification in the queue, then updates are not retrieved at this time in step 355. If there are one or more update notifications in the queue, then the computing device 110a-110c proceeds to step 360.

In step 360, the computing device 110a-110c may retrieve one or more updates from the server 115 corresponding to the one or more update notifications in the queue. To do this, the computing device 110a-110c may send an update request to the server 115. When the computing device 110a-110c receives the updates from the server 115, the computing device may synchronize its local browser information with the received updates at this time. Finally, in step 365, the computing device 110a-110c clears the queue.

In another aspect, when the computing device 110a-110c is idle, the computing device 110a-110c may monitor a time period since the computing device 110a-110c last received an update from the server 115. In this aspect, the computing device 110a-110c may send an update request to the server 115 when the time period since the last received update is equal to or greater than a maximum update time interval (e.g., one hour) and the computing device 110a-110c received one or more update notifications since the last received update. The update request may request all of the updates corresponding to the update notifications in the queue. After receiving the updates from the server 115, the computing device 110a-110c may clear the update notifications from the queue. When the user 105 starts using the computing device 110a-110c, the computing device 110a-110c may send an update request to the server 115 at this time requesting all updates corresponding to the update notifications currently in the queue.

In one aspect, when the computing device 110a-110c is idle, the computing device 110a-110c may be disconnected from the server 115 most of the time and only periodically connect to the server 115 for a short time period to receive updates. For example, the computing device 110a-110c may connect to the server 115 after every update time interval (e.g., one hour) for a short time period to receive updates. Each time the computing device 110a-110c connects to the server 115, the computing device 110a-110c may automatically log onto the server 115, for example, by sending user credentials stored in local memory to the server 115. After the computing device 110a-110c is connected to the server 115, the sever 115 may send the computing device any updates that may have accumulated at the server 115 since the computing device 110a-110c was last updated. Otherwise, the server 115 may notify the computing device 110a-110c that there are no updates. After receiving the updates or notification of no updates, the computing device 110a-110c may disconnect from the server 115.

The computing device 110a-110c may reconnect with the server 115 and repeat the above process after another update time interval (e.g., one hour). When the user 105 starts using the computing device 110a-110c, the computing device 110a-110c may reconnect with the server 115 and receive any updates that may have accumulate at the server 115 since the computing device 110a-110c was last updated.

This aspect of the subject technology advantageously conserves battery life for a mobile computing device 110b. This is because the computing device 110b only connects to the server 115 periodically to receive updates when the computing device 110b is idle. For the example in which the computing device 110b connects to the server 115 via a wireless link, the computing device 110b may only need to periodically turn on a radio transceiver to receive updates from the server 115. The radio transceiver may be powered down most of the time when the computing device 110b is idle to conserve battery life.

In one aspect, when the computing device 110a-110c is idle, the computing device 110a-110c may stay disconnected from the server 115 during a particular time of day (e.g., between 12:00 a.m. and 5:00 a.m.) based on past user activity. For example, the computing device 110a-110c may keep track of time periods during which the user 105 does not use the computing device 110a-110c (i.e., the computing device is idle) over one or more days. Based on this information, the computing device 110a-110c may determine a time of day during which the computing device 110a-110c is to stay disconnected from the server 115 when the computing device 110a-110c is idle.

For example, if the computing device observes that the user 105 does not use the computing device 110a-110c (i.e., the computing device is idle) between the hours of 12:00 a.m. and 5:00 a.m. over one or more days, then the computing device 110a-110c may determine to keep the computing device 110a-110c disconnected from the server 115 during this time period for each one of a plurality of subsequent days when the computing device 110a-110c is idle. Outside of this time period, the computing device 110a-110c may periodically connect to the server 115 to retrieve updates when the computing device 110a-110c is idle.

In one aspect, when the computing device 110a-110c detects the user 105 using the device and the computing device 110a-110c receives an update notification from the server 115, the computing device 110a-110c may immediately send a corresponding update request to the server 115. The computing device 110a-110c may receive an update notification from the server 115 when the user 105 is using the device, for example, when the user 105 quickly switches between two computing devices 110a-110c.

In response to the update request, the server 115 may send the corresponding update to the computing device 110a-110c and the computing device 110a-110c may update its local copy of the browser information accordingly. Thus, the computing device 110a-110c may be continuously synchronized with the user account when the user 105 is using the computing device 110a-110c (i.e., the computing device is not idle).

The computing device 110a-110c may detect the user 105 using the device, for example, when a time period since the last detected user activity on the device is less than a certain time period (e.g., a few minutes). The detected user activity may include a mouse movement, a user finger on a touch screen, the user 105 entering text and/or commands into the computing device 110a-110c using a keyboard, etc.

Figure 4:
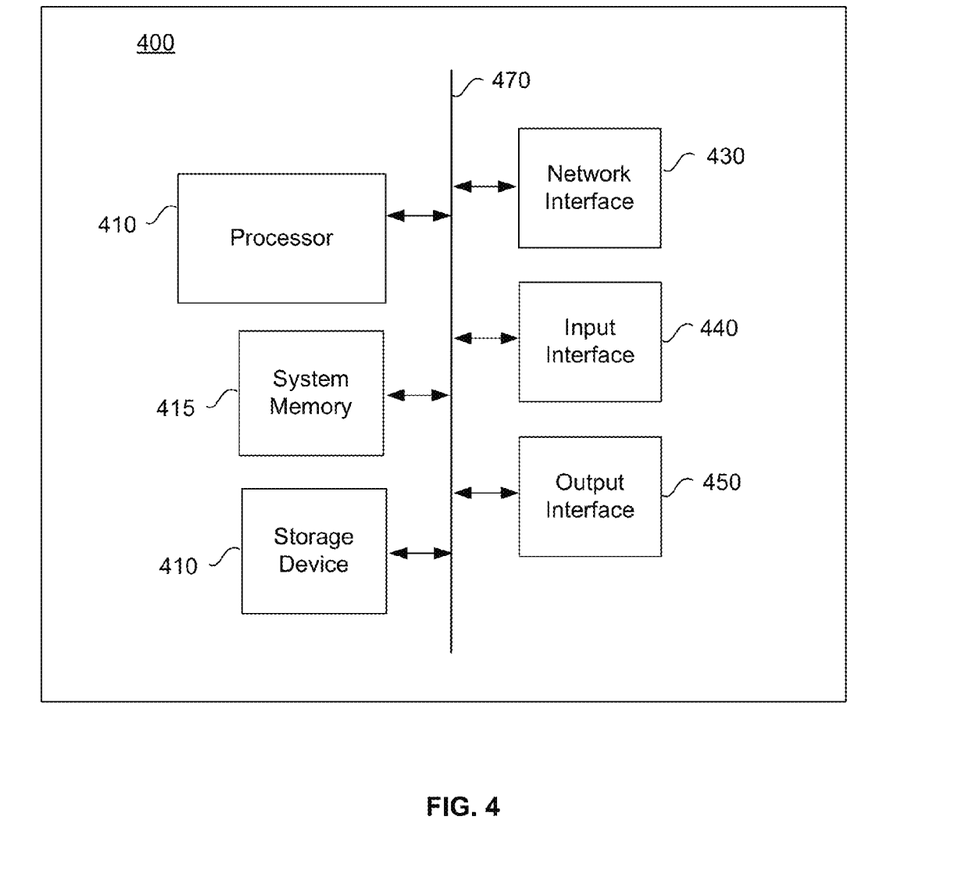
FIG. 4 conceptually illustrates an electronic system with which some implementations of the subject technology are implemented.

FIG. 4 conceptually illustrates an electronic system 400 with which some implementations of the subject technology are implemented. The electronic system 400 can be used to implement anyone of the computing devices 110a-110c shown in FIG. 1. While the electronic system 400 is shown in one configuration in FIG. 4, it is to be understood that the electronic system 400 may include additional, alternative and/or fewer components.

In the example shown in FIG. 4, the electronic system 400 includes a processor 410, system memory 415, a storage device 420, a network interface 430, an input interface 440, an output interface 450, and a bus 470. The bus 470 collectively represents all system, peripheral, and chipset buses that communicatively connect the numerous components of the electronic system 400. For instance, the bus 470 communicatively connects the processor 410 with the system memory 415 and the storage device 420. The processor 410 may retrieve instructions from one or more of these memories and execute the instructions to implement processes according to various aspects of the subject technology. The processor 410 may comprise a single processor or a multi-core processor in different implementations.

The storage device 420 may comprise a solid state drive, a magnetic disk, or an optical drive. The storage device 420 may be used to store an operating system (OS), programs, and/or files. The system memory 415 may comprise volatile memory (e.g., a random access memory (RAM)) for storing instructions and data that the processor 410 needs at runtime. Instructions for performing processes according to various aspects of the subject technology may be stored in the storage device 420 and loaded into the system memory 415 during runtime for execution by the processor 410. For example, a web browser application may be stored in the storage device 420 and loaded into the system memory 415 during runtime for execution by the processor 410. Also, the processor 410 may store local changes to the browser information in the system memory 415 and later write the local changes to the storage device 420 for long term storage of the changes. A local copy of the browser information may be stored in the system memory 415 and/or the storage device 420.

The network interface 430 enables the processor 410 to communicate with the server 115 over the network 125 (e.g., a local area network (LAN), a wide area network (WAN), an intranet, the Internet, etc.). The network interface 430 may include a wireless communication module for communicating with a base station or wireless access point 130 connected to the network 125 over a wireless link (WiFi wireless link, cellular wireless link, etc.).

The input interface 440 enables the user 105 to communicate information and commands to the processor 410. For example, the input interface 440 may be coupled to an alphanumeric keyboard and/or a pointing device (e.g., touch pad or mouse) to receive commands from the user 105.

The output interface 450 enables the processor 410 to communicate information to the user 105. For example, the output interface 450 may be coupled to a display (e.g., liquid crystal display (LCD)) and/or a printer to output information from the processor 410 to the user 105.

Many of the above-described features and applications may be implemented as a set of machine-readable instructions stored on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this disclosure, the term "software" and "program" is meant to include firmware or applications stored in a memory, which can be executed by a processor. Also, in some implementations, multiple software aspects can be implemented as sub-parts of a larger program while remaining distinct software aspects. In some implementations, multiple software aspects can also be implemented as separate programs. Finally, any combination of separate programs that together implement a software aspect described here is within the scope of the disclosure. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computers and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

It is understood that any specific order or hierarchy of steps in the processes disclosed is an illustration of exemplary approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "exemplary" is used herein to mean "serving as an example or illustration." Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A computer-implemented method for delaying synchronization of a plurality of computing devices, the method at a computing device of the plurality of computing devices comprising:
    receiving, from a remote server distinct from the plurality of computing devices, one or more update notifications at the computing device;
    storing the update notifications in a queue on the computing device;
    determining that the computing device is idle when the computing device is in one of a screen saver mode or a locked mode, wherein the screen saver mode and the locked mode are distinct from a sleep mode;
    when the computing device is idle, delaying sending of an update request for synchronization information corresponding to the update notifications until a user has started using the computing device;
    determining whether the user has started using the computing device;
    when the user has started using the computing device, sending to the remote server the update request for the synchronization information corresponding to the update notifications;
    receiving the synchronization information corresponding to the update request;
    performing conflict resolution at the computing device based on the received synchronization information; and
    updating the computing device with the received synchronization information.

2. The method of claim 1, wherein determining whether the user has started using the computing device comprises determining that the user has started using the computing device when the computing device switches to an active mode from at least one of a screen saver mode, a sleep mode, or a locked mode.

3. The method of claim 1, wherein determining whether the computing device is idle comprises determining that the computing device is idle when user activity is not detected at the computing device for a certain period of time.

4. The method of claim 3, wherein the user activity comprises at least one of a keyboard entry, a touch on a touch screen, and a mouse movement.

5. The method of claim 1, wherein determining whether the user has started using the computing device comprises determining that the user has started using the computing device when user activity is detected at the computing device.

6. The method of claim 5, wherein the user activity comprises at least one of a keyboard entry, a touch on a touch screen, and a mouse movement.

7. The method of claim 1, further comprising updating local information stored on the computing device with the retrieved synchronization information.

8. The method of claim 7, wherein the synchronization information comprises at least one of a bookmark entry, browser tab information, autofill information, browser history information, and theme information.

9. The method of claim 1, further comprising:
    while the computing device is idle, determining whether an update time interval has elapsed since a last time that the computing device was updated with synchronization information; and
    if the update time interval has elapsed, then retrieving the synchronization information corresponding to the update notification regardless of whether the user has started using the computing device.

10. A non-transitory machine-readable medium comprising instructions stored therein, which when executed by a machine, cause the machine to perform operations for delaying synchronization of a plurality of computing devices, the operations at a computing device of the plurality of computing devices comprising:
    receiving, from a remote server distinct from the plurality of computing devices, one or more update notifications at the computing device;
    storing the update notifications in a queue on the computing device;

determining that the computing device is idle when the computing device is in one of a screen saver mode or a locked mode, wherein the screen saver mode and the locked mode are distinct from a sleep mode;

when the computing device is idle, delaying sending of an update request for synchronization information corresponding to the update notifications until a user has started using the computing device;

determining whether the user has started using the computing device;

when the user has started using the computing device, performing the steps of:
 (a) sending the update request for the synchronization information to the remote server;
 (b) receiving the synchronization information from the remote server in response to the update request;
 (c) performing conflict resolution at the computing device based on the received synchronization information; and
 (d) updating local information stored on the computing device with the received synchronization information.

11. The machine-readable medium of claim 10, wherein determining whether the user has started using the computing device comprises determining that the user has started using the computing device when the computing device switches to an active mode from at least one of a screen saver mode, a sleep mode, or a locked mode.

12. The machine-readable medium of claim 10, wherein determining whether the computing device is idle comprises determining that the computing device is idle when user activity is not detected at the computing device for a certain period of time.

13. The machine-readable medium of claim 12, wherein the user activity comprises at least one of a keyboard entry, a touch on a touch screen, and a mouse movement.

14. The machine-readable medium of claim 10, wherein determining whether the user has started using the computing device comprises determining that the user has started using the computing device when user activity is detected at the computing device.

15. The machine-readable medium of claim 14, wherein the user activity comprises at least one of a keyboard entry, a touch on a touch screen, and a mouse movement.

16. The machine-readable medium of claim 10, wherein the synchronization information comprises at least one of a bookmark entry, browser tab information, autofill information, browser history information, and theme information.

17. The machine-readable medium of claim 10, wherein the operations further comprise:
 while the computing device is idle, determining whether an update time interval has elapsed since a last time that the computing device was updated with synchronization information; and
 if the update time interval has elapsed, then performing at least the steps (a) and (b) regardless of whether the user has started using the computing device.

18. A system for delaying synchronization of a plurality of computing devices computing device, the system at a computing device of the plurality of computing devices comprising:
 one or more processors; and
 a machine-readable medium comprising instructions stored therein, which when executed by the one or more processors, cause the one or more processors to perform operations comprising:
  receiving, from a remote server distinct from the plurality of computing devices,
  one or more update notifications at the computing device;
  storing the one or more update notifications in a queue at the computing device;
   determining that the computing device is idle when the computing device is in one of a screen saver mode or a locked mode, wherein the screen saver mode and the locked mode are distinct from a sleep mode;
   when the computing device is idle, delaying sending of an update request for synchronization information corresponding to the update notifications until a user has started using the computing device;
  determining whether the user has started using the computing device;
   when the user has started using the computing device, performing the steps of:
    (a) sending the update request for the synchronization information to the remote server;
    (b) receiving the synchronization information from the remote server in response to the update request;
    (c) performing conflict resolution at the computing device based on the received synchronization information; and
    (d) updating local information stored on the computing device with the received synchronization information.

19. The system of claim 18, wherein determining whether the user has started using the computing device comprises determining that the user has started using the computing device when the computing device switches to an active mode from at least one of a screen saver mode, a sleep mode, and a locked mode.

20. The system of claim 18, wherein determining whether the computing device is idle comprises determining that the computing device is idle when user activity is not detected at the computing device for a certain period of time.

21. The system of claim 20, wherein the user activity comprises at least one of a keyboard entry, a touch on a touch screen and a mouse movement.

22. The system of claim 18, wherein determining whether the user has started using the computing device comprises determining that the user has started using the computing device when user activity is detected at the computing device.

23. The system of claim 22, wherein the user activity comprises at least one of a keyboard entry, a touch on a touch screen, and a mouse movement.

24. The system of claim 18, wherein the operations further comprise updating local information stored on the computing device with the received synchronization information.

25. The system of claim 24, wherein the synchronization information comprises at least one of a bookmark entry, browser tab information, autofill information, browser history information, and theme information.

26. The system of claim 18, wherein the operations further comprise:
 while the computing is device is idle, determining whether an update time interval has elapsed since a last time that the computing device was updated with synchronization information; and
 if the update time interval has elapsed, then performing the steps (a)-(d) regardless of whether the user has started using the computing device.

* * * * *